Feb. 19, 1952 H. GRAYSON ET AL 2,586,028
RADIO ECHO MOVING TARGET INDICATOR
Filed Aug. 5, 1947 3 Sheets-Sheet 1
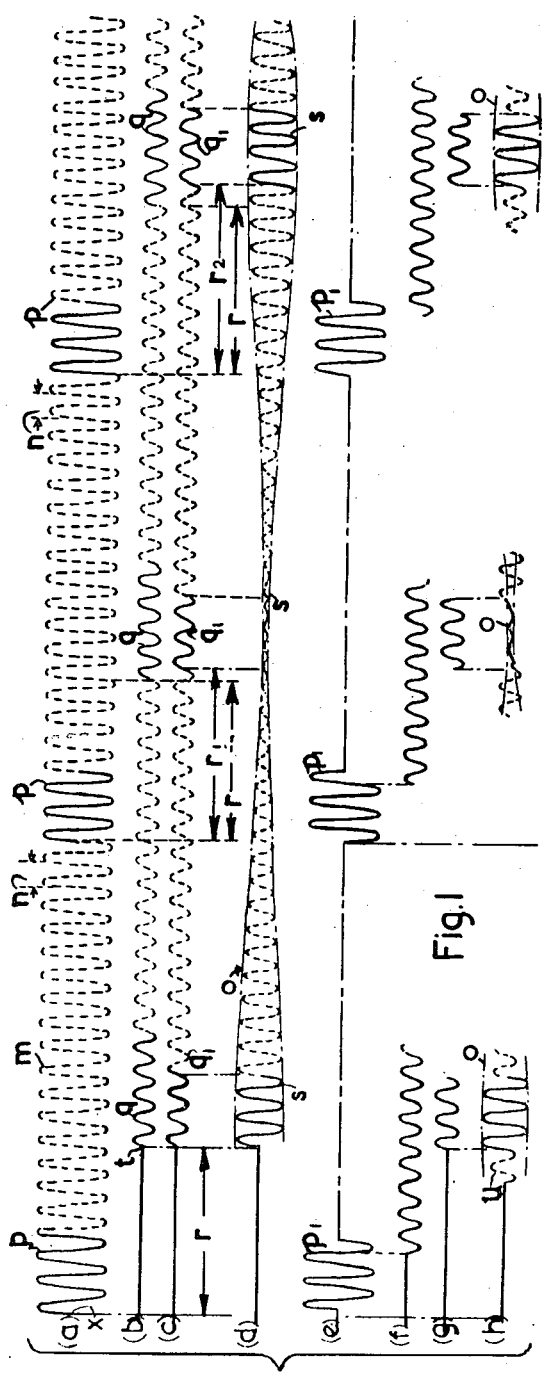
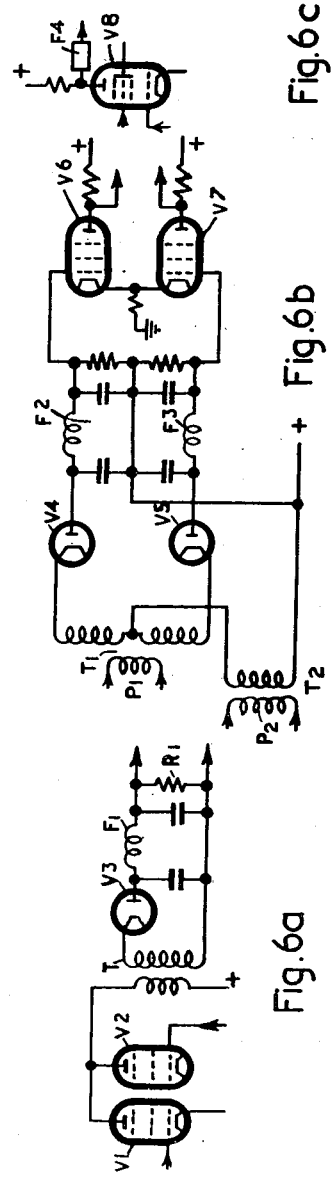
*Inventors*
H. Grayson
D. E. Brown
By—
*Attorney*

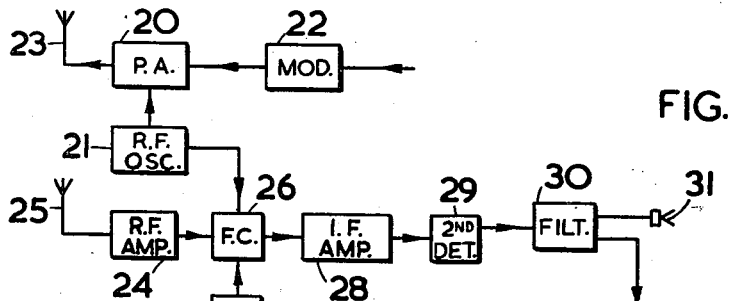
FIG. F 2
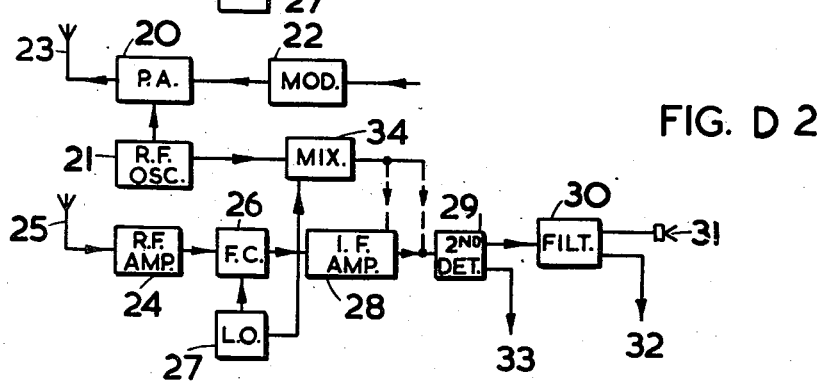
FIG. D 2
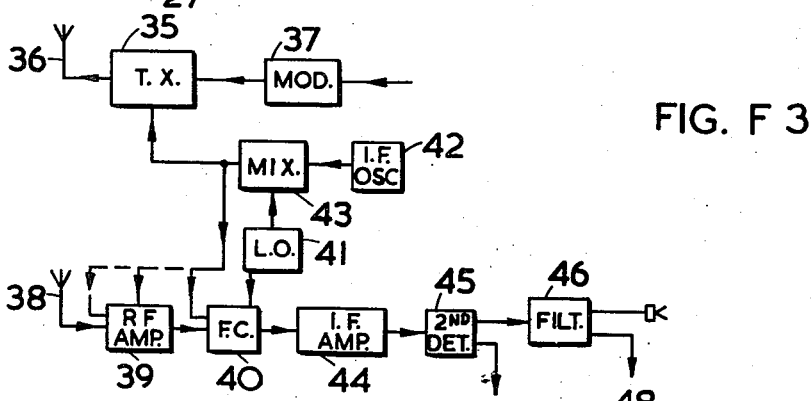
FIG. F 3
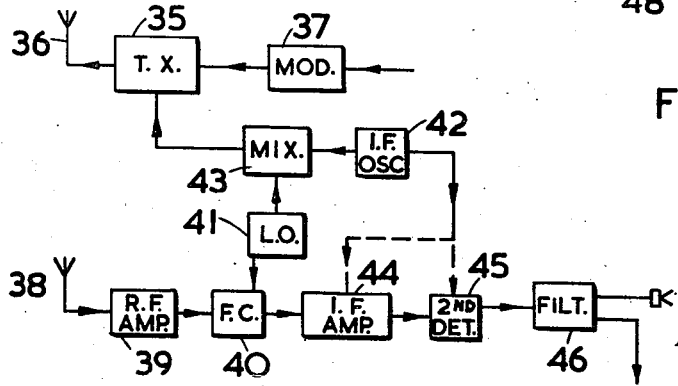
FIG. D 3
H. GRAYSON
& D. E. BROWN
Inventors

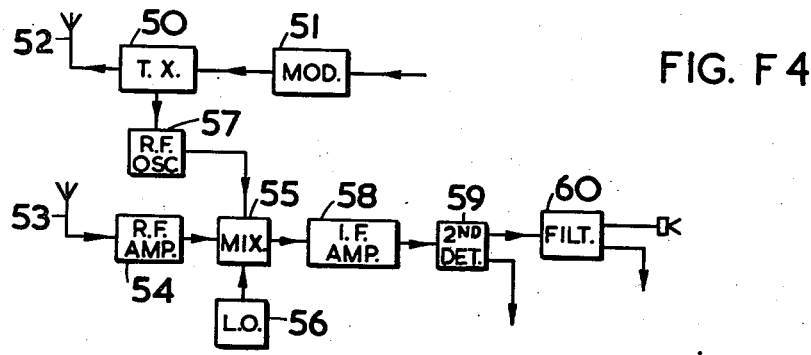
FIG. F 4
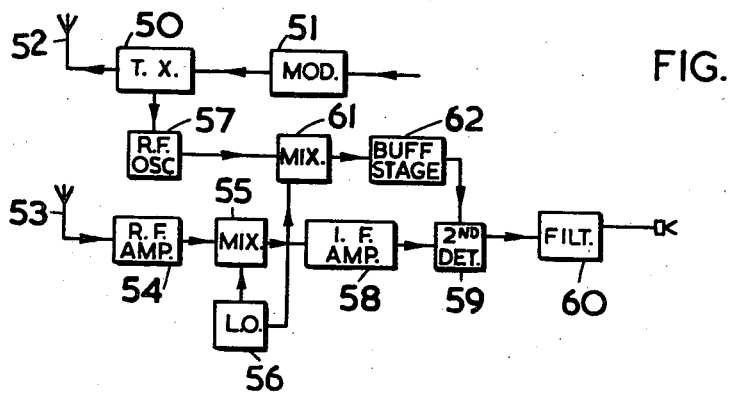
FIG. D 4
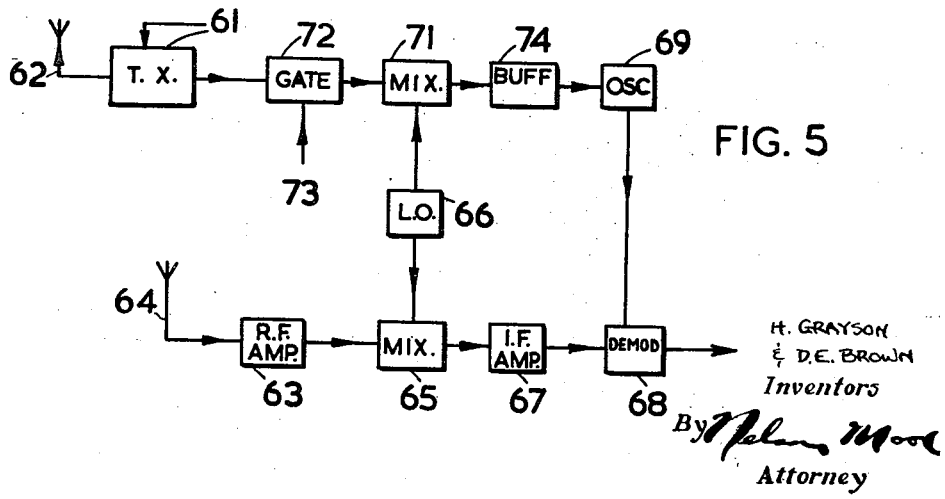
FIG. 5

Patented Feb. 19, 1952

2,586,028

UNITED STATES PATENT OFFICE 2,586,028

RADIO ECHO MOVING TARGET INDICATOR

Harry Grayson, Longsight, Manchester, and Denis Edwin Brown, Chilton, near Didcot, England Application August 5, 1947, Serial No. 766,309
In Great Britain February 28, 1945

Section 1, Public Law 690, August 8, 1946
Patent expires February 28, 1965

7 Claims. (Cl. 343—12)

This invention relates to radio-location systems in which a pulsed radio-frequency exploring wave is radiated by a transmitter and the echo pulses from a distant object are caused to operate a suitable receiving device to provide information as to the presence of and preferably the range and/or bearing of such distant object from the receiving station.

In arrangements of the above kind, difficulty is experienced in dealing with echo signals which are weak in intensity, in the presence of other interfering signals which are unrelated to the object which it is desired to detect.

A major source of interfering signal is that due to echo returns from fixed objects such as buildings, cliffs, mountains and similar objects lying within the exploration field of the apparatus. The comparatively large size of such fixed objects with relation to the object being sought, e. g. an aircraft, frequently results in the presence of fixed-object echoes, known in the art as "permanent echoes" or "clutter," of such intensity and disposition within the exploration field of the apparatus as to render the latter blind over certain areas. In mountainous country, the severity of such permanent echoes may be such as to render the apparatus virtually useless.

As a means of combating the above difficulties due to "clutter," advantage can be taken of the known "Doppler effect" by which the echo signal returned from any object having movement which includes a component of radial velocity with respect to the receiving point is changed in frequency from that of the original exploring wave by an amount depending upon the transmitting frequency used and the radial velocity. Since serious "clutter" normally emanates from objects which possess little or no radial velocity, a useful distinction is provided.

By mixing, in the receiver, the echo signal from such a moving object with a "clutter" signal at the same range a beat-frequency component can be resolved and, by a process of filtering, this beat frequency component, can be utilised to provide either an audio or visual response, the numerical value of the beat-frequency being indicative of the radial speed of the moving object under observation.

Such arrangements possess the disadvantage of requiring a fixed "clutter" echo at the same range as the moving object before application of the technique is possible. In addition, as directional reception is normally an essential feature of radio-location systems, such fixed object must also be of substantially the same directional bearing as the moving object. This restricts the utility of the system and necessitates a change in operating technique on transition from a "clutter" search area to one not obstructed by "clutter" and vice-versa, a procedure which may prove impracticable operationally. Furthermore, the widely varying intensity of the echoes returned from fixed objects of different characters is not conducive to efficient operation in the mixing stages of the receiver by which the "Doppler" beat is resolved.

The object of the present invention is to provide a radio-location system employing a pulsed exploring beam in which the detection of moving objects by use of the "Doppler" effect is possible without the need for a fixed "clutter" echo.

This is achieved according to the broad aspect of the present invention by mixing some or all of the received echo signals, or signals derived from the echo signals, with a suitable "reference" oscillation generated locally to the radio-location apparatus and adapted to perform the function of the "clutter" signals of the previously described arrangements. There are a number of methods by which such reference oscillation may be provided and/or employed, the necessary conditions for successful operation being—(a) the maintenance of a chosen phase-relationship between such reference oscillation and the oscillation of the related exploring pulse, as measured at a pre-determined time-instant during the radiation period of the latter, and (b) the persistence of such reference oscillation for a time period after the related exploring pulse long enough to permit its application to the receiver circuit during the reception of the returned echo signal.

In one arrangement according to the invention the exploring pulses are generated by periodic amplification of an oscillation derived from a source which also provides, either directly or after suitable frequency changing, the necessary "reference" oscillation for mixing with the received echo signals within the receiver circuit. Such common source may operate continuously throughout the time period covering a plurality of exploring pulses or alternatively it may operate intermittently, commencing prior to each exploring pulse and ceasing before the time of initiation of the next exploring pulse but persisting long enough to permit its coincidence with the returned echo signals.

In a second arrangement according to the invention the exploring pulses are provided by a pulse transmitter, into a suitable circuit element of which is injected an oscillation derived from a source which also provides, either directly or after suitable frequency changing, the necessary "reference" oscillation for mixing with the received echo signals within the receiver circuit. By virtue of such injection, which may be made continuously or intermittently at instants coincident with the commencement of the pulse modulations applied to the said transmitter, the latter may be caused to commence each pulse oscillation in-phase with the injected oscillation.

In a third arrangement according to the invention the exploring pulses are provided by any suitable form of pulse transmitter and the pulse oscillations therefrom are arranged, either directly or after frequency changing, momentarily to lock the phase of a local oscillation source which provides, either directly or after suitable frequency changing, the necessary "reference" oscillation for use in the receiver. By suitable limitation of the time-portion of the exploring pulse oscillation, e. g., the commencement or the termination, which is applied to the local oscillation source, so the latter may be phase-locked to any desired point, e. g., the commencement or the termination, of each exploring pulse. Normally it is satisfactory to phase-lock the local source to the termination or trailing edge of each pulse and this may be effected in the simplest manner by feeding the exploring pulse as a whole to the local oscillation source.

The local oscillation source above referred to need not operate at the oscillation frequency of the exploring pulses. It may operate at a different frequency and the necessary frequency changing effected by suitable known means. Furthermore it is not essential that the phase-relationship between the exploring pulse oscillation and the local "reference" oscillation at the chosen instant of locking should be one of precise "in-phase." Any convenient but constant relationship may be used, e. g. in anti-phase or in quadrature.

The mixing of the echo signals and the reference oscillation may be effected at the fundamental frequency of transmission and reception or after frequency-changing, for instance, at the intermediate frequency of a superheterodyne receiver. Demodulation may be effected by the "homodyne" method and the "reference" oscillation used as the "homodyne" reference oscillation.

In order that the nature of the invention may be more readily understood a number of embodiments thereof will now be described by way of example with reference to the accompanying drawings, in which:

Figure 1 comprises a series of diagrams (a)-(h) serving to illustrate the nature and applications of the present invention.

Figures F2, D2, F3, D3, F4, D4 and 5 are block diagrams of alternative arrangements according to the invention.

Figures 6a, 6b and 6c show various circuit arrangements for effecting demodulation by the "homodyne" method in accordance with the invention.

The process by which "Doppler" beat components are obtained by the known arrangements previously referred to will first be described with reference to diagrams (a)-(d) of Figure 1. Before proceeding however it must be emphasized that, in view of the wide diversity of both frequency and amplitudes of the various oscillations which are represented in the diagrams of Figure 1, such diagrams are not to scale. For example, where an R. F. pulse or wave is represented there will, in practice, be a very much larger number of oscillation cycles present than the number shown while the relative time spacing between successive pulses will likewise be much greater, measured in cycles of the transmitted oscillations, than as shown. Similar considerations apply to the relative amplitudes of the various oscillations.

Diagram (a) represents, when taken as a whole, a continuous oscillation such as the radiated carrier wave of a C. W. transmitting station while diagram (b) represents, again when taken as a whole, a much weaker but otherwise similar counterpart oscillation as might be received at a suitable receiving point after reflection or re-radiation by a fixed object lying within the operational fields of both transmitter and receiver. The arrival instant $t$ of the commencement of the reflected oscillation at the receiving point is delayed after the instant of commencement $x$ of the original oscillation of diagram (a) by a time-interval $r$ which is determined by the path length from transmitter to object and from the latter to receiver. When, as is normally the case with radio-location apparatus, the transmitter and receiver are spaced a negligible distance apart, this time-interval is directly proportional to the range of the reflecting object. Time-intervals such as that shown at $r$ will accordingly be referred to hereinafter as "ranges."

Diagram (c) represents, again when taken as a whole, a further counterpart oscillation similar to that of diagram (b) but arriving, in this instance, from an object which is moving away from the common transmitting and receiving point. In consequence of the radial velocity component possessed by such moving object the frequency of the returned oscillation will be changed from i. e., lower than, that of the originating oscillation of diagram (a) due to the known "Doppler" effect. The amount of such frequency change is given by the formula:

$$fd = \frac{2 \times V}{c} fo$$

where $fd$ = frequency change in c. p. s.
$fo$ = transmission frequency in c. p. s.
$V$ = radial velocity
$c$ = velocity of E. M. waves  } in similar units e. g. metres/sec.

As an example of the values encountered in practice, if the radial velocity component is 180 M. P. H. and the fundamental transmission frequency is 200 mc./s., the Doppler frequency change will amount to 108 c. p. s.

If now the two received oscillations of diagrams (b) and (c) are mixed within the receiver circuits in known manner they will produce a resultant, shown in diagram (d) having a modulation envelope which contains a beat component oscillation at the difference between the two echo frequencies i. e. at the "Doppler" frequency change value. This is shown in diagram (d) where the resultant waveform is seen to vary in amplitude against time according to the beat frequency envelope o. If such "Doppler-beat" frequency is extracted, such as by rectifying and filtering, it may be used as an indication of the presence of an object exhibiting radial movement with respect to the apparatus while measurement of the frequency of the beat-component will provide information as to the numerical value of the radial velocity component possessed by the moving object.

Precisely similar considerations will apply when the moving object is travelling towards the transmitting/receiving point, the amount of frequency change being the same but caused, in this instance, by increase in the frequency of the received oscillation.

If now the case of pulse modulated transmission, as commonly used in radio-location, be considered, it will be found that precisely similar considerations will apply. This is illustrated in the same diagrams (a) to (d) by the full-line portions of the various oscillations. Each radiated pulse $p$ of diagram (a) will produce a returned echo $g$ from the fixed object, see diagram (b), after similar "range" intervals $r$ while the moving object will give rise to further echoes $g1$ of changed frequency as before and after progressively increasing "range" intervals $r$, $r1$ and $r2$ as shown in diagram (c). As will be seen from diagram (d) the resultant pulse-form signals $s$ obtained after mixing carry, from pulse to pulse, a beat-frequency modulation envelope $o$ as before. Provided observation of the resultant output is extended over a sufficient number of pulses, an output at the "Doppler-beat" frequency may be resolved as before.

It will be noted that the above described pulse operation, which corresponds to the known "clutter" combating system previously referred to, requires for its operation the existence within the exploration field of the apparatus of a fixed object capable of providing an echo at a range which coincides with or overlaps that of the moving object which it is desired to detect. This requirement has the limitations and disadvantages already referred to.

The present invention resides in providing a locally generated reference oscillation which serves as a substitute for the fixed object or "clutter" echo. Examination of such fixed object echo as shown in diagram (b) discloses that it always possesses a fixed phase-relationship with the exploring pulse to which it is related. This is, of course, dictated by the unaltering value of the path-distance from transmitter to object and thence back to receiver.

One manner of providing such a "reference" oscillation may be described with reference to diagram (a). If, by a process of periodic amplification of a continuous sine-wave oscillation such as that shown by the dotted line waveform $m$, a series of pulses is formed, each of such pulses will be rigidly phase-locked to their parent oscillation $m$. A counter-part of the latter may therefore be used in the receiver instead of a fixed object echo to produce a Doppler-beat component as already described. With such an arrangement the various exploring pulses will be "coherent" in phase, that is to say, each train of oscillations forming a pulse will be a section of a continuous sine-wave at the frequency of transmission. The individual pulse trains may or may not be identical with one another.

Instead of operating continuously, the parent sine wave oscillation from which the exploring pulses are derived may be suppressed between pulses, e. g. in the intervals $n$ in diagram (a). Provided such suppression is delayed until after the longest range period $r$ at which it is desired to detect Doppler-beating, operation will be as before but in this instance the various exploring pulses will not necessarily be "coherent" in phase as above described.

In a further arrangement the pulses $p$ of diagram (a) are generated in the normal way by any suitable form of pulse transmitter, into a suitable circuit element of which, however, is fed a component of a local oscillation such as that shown at $m$ in diagram (a). A suitable injection point is the main oscillatory circuit of the pulse oscillator and as a result of such injection, the pulses $p$ will build up according to the phase of the oscillation $m$ rather than at random as would otherwise be the case. There will in consequence be the desired constant phase relationship between the exploring pulse oscillations and the local oscillation whereby the latter may be used as a "reference" source as before. In this instance also, the local oscillation source may be continuously running or of intermittent character as before. In neither case, however, will the exploring pulses necessarily be "coherent" in phase as previously defined. Although coherence would appear to be imparted when a continuously operating local source is used, such is not the case in view of the tendency of the more powerful pulse oscillator to take charge and pull the local source into phase with itself when its build-up reaches substantial power levels. If such "pulling" of the local oscillation source is thought undesirable it may be avoided by the interposition of suitable buffer or frequency-changing stages between the local source and the transmitter. Alternatively the injection of the local source may be limited, by suitable "gating" means, to a very small time-interval coincident with the initial instant only of each transmitter pulse. As a further alternative such "pulling" may be allowed to take place in which case a combination of the method just described and a third method about to be described results in which the transmitter having been started in the correct phase by the local source then proceeds to lock the phase of the local source.

A further method of obtaining the desired "reference" oscillation is to arrange for the exploring pulses to effect phase-locking of a local oscillation source which is subsequently used as a "reference" source for beating with the returned echo signals. Diagram (e) illustrates a series of pulses $p1$ as provided by a normal pulsed transmitter. It will be noted that these pulses are "non-coherent," i. e., they bear a random phase-relationship to one another. By using a suitable portion of each pulse $p1$ to control the oscillatory circuit of a local oscillation source, the latter can be made to supply a "reference" oscillation which is locked in phase to the exploring pulse oscillation. As an example, diagram (f) shows the reference oscillation locked in phase to the trailing edge of each pulse $p1$. This local oscillation source may be arranged to operate intermittently as shown or may run continuously, being periodically re-phased by the exploring pulses as the latter are radiated. Diagrams (g) and (h) illustrate respectively the returned echo and resultant waveforms after mixing, the latter diagram illustrating how the local oscillation component $u$, which is, of course, continuously present in the output, has returned echo signals superimposed thereon, said returned echo signals having a Doppler-beat frequency envelope $o$.

Instead of phase-locking the local source to the trailing edge of each pulse, it is possible, by the use of suitable "gating" circuits to apply other selected instants such as the commencement or the mid-period of the exploring pulse trains to the local source. This may be desirable in some instances where the frequency stability of the decay period of the exploring pulses is found to be inferior.

In the arrangements so far described it has been assumed that the locally generated reference oscillation is provided at the same frequency as that of the exploring pulses or the resultant intermediate-frequency after frequency conversion in the radio location receiving apparatus.

This will normally be the case within the limits of practicable circuit stability but is by no means essential. The use of a reference oscillation operating at a frequency which differs from that of transmission, or that of the related receiver intermediate-frequency after frequency conversion, results in a change of the resultant "Doppler-beat" and in the appearance of a modulation inside the rectified pulse envelope of echo signals returned from fixed objects. As normally the difference between the transmitter frequency or its related receiver intermediate-frequency and the reference oscillation frequency is kept quite small this latter effect introduces only a small apparent distortion of the pulse shape and is not troublesome.

The development of the above described amplitude/time variation referred to as a "Doppler-beat modulation envelope" may alternatively be regarded as arising from the change of phase which takes place between the various pulse signals returned from an object having a radial velocity component, with reference to fixed object echo signals or an equivalent local reference oscillation; this change of phase being due, of course, to the increasing or decreasing path distance travelled by such moving object echo signals. Hereinafter in this specification, for the purpose of consistency the Doppler-beat method of explanation will be adhered to.

Figure F2 shows in block schematic form a simple radio-location arrangement for carrying out the "Doppler-beat" detection system by the first or "coherent" pulse method described in connection with diagrams (a) to (d) of Figure 1. In this figure 20 denotes a power amplifier of known type which serves periodically to amplify the R. F. output of an oscillator 21 under the control of modulating circuits 22 which regulate the application of an essential power supply, e. g., the H. T. supply, to the power amplifier 20. The output pulses from power amplifier 20, which will be "coherent" in phase with one another are fed to a transmitting aerial 23. 24 denotes the R. F. amplifying stage or stages of a pulse receiver supplied by receiving aerial 25 and feeding a mixer or frequency-converter stage 26 supplied also with a local heterodyne oscillation from source 27. Units 24, 26 and 27 form part of a normal superheterodyne receiver arrangement and provide a normal signal output at the chosen receiver intermediate-frequency in respect to normal input signals, to the I. F. amplifier 28. The oscillator 21, however, is also arranged to supply a "reference" oscillation at the fundamental frequency of transmission to the mixer stage 26 or to the R. F. amplifying stage 24 or to the aerial circuit for the purpose already described in connection with diagrams (a) and (d) of Figure 1 and as a result there will be fed to the I. F. amplifier 28 a pulse signal at I. F. having a modulation envelope component at the "Doppler-beat" frequency whenever an echo signal whose frequency has been changed by Doppler effect is received by aerial 25. This component will be resolved at the second detector 29 and after further amplification and filtering in unit 30 may be applied to an audio device such as a loud-speaker 31 and/or to other indicating means such as a cathode-ray tube or a tuned-reed frequency indicator via lead 32. The signal output from the second detector 29 can be utilized to operate normal display or indicator means through lead 33.

Alternatively the mixing of the "reference" oscillation with received echo-signals may be effected at the receiver intermediate-frequency by the modified arrangement shown in Figure D2. In this instance the oscillator 21 supplies an output to a further mixer stage 34 instead of to the first mixer stage 26. This further mixer stage is also supplied with the heterodyne oscillation from the local heterodyne oscillation source 27 whereby an output at the receiver intermediate-frequency is produced which is phase-related in the required manner to the transmitter phasing oscillator 21. This "reference" oscillation output from mixer 34 is then injected either into the second detector 29 or into a stage of the preceding I. F. amplifier 28.

The block diagrams of Figures F2 and D2 may also be used to illustrate alternative embodiments operating according to the second and/or third methods of deriving the desired "reference" oscillation previously described. In such arrangement the unit 20 will comprise an oscillator circuit with, if desired, a suitable power amplifier stage into which the oscillation of the unit 21 is injected to effect phasing of the commencement of each transmitter pulse and/or be itself phase-locked by the transmitter as the case may be. The remainder of the arrangement operates as before.

Figure F3 shows an alternative arrangement in which the local oscillation source from which the desired "reference" oscillation is derived operates at a frequency different from that of transmission. In this arrangement 35 denotes a pulse transmitter of suitable known type delivering its output to transmitting aerial 36 in the form of pulses under the control of pulse-modulating circuit 37. A receiving aerial 38 feeds an R. F. amplifier 39 which in turn supplies its output to a mixer or frequency converter stage 40 which is provided in known manner with a local heterodyne oscillation source 41 by which the mixer stage can effect frequency changing to I. F. for further amplification in I. F. amplifier stage 44 before final demodulation in stage 45. The local heterodyne oscillation source 41 also supplies a second mixer stage 43 to which is applied the output from a stable-frequency oscillator 42 operating at the chosen intermediate-frequency of the receiver. In consequence there is available as an output from mixer stage 43 an oscillation at the fundamental transmission frequency and this is injected into the main oscillatory circuit of the pulse oscillator of the transmitter 35 to effect phase-locking of each pulse build-up in the manner already described. This R. F. oscillation output from mixer stage 43 is also applied to the receiver mixer stage 40 where, in consequence of its locked phase-relationship with the transmitted pulses, it serves as a suitable reference oscillation for resolving any "Doppler" frequency change of received echo signals into a beat frequency component which, after filtering in unit 46 can be used to provide an audio output by loud-speaker 47 or be fed by lead 48 to other display means.

Figure D3 illustrates yet a further alternative arrangement in which the "reference" oscillation is applied at intermediate-frequency from the stable-frequency oscillator 42 either directly to the second detector stage 45 or to a stage of the preceding I. F. amplifier 44. In this instance, of course, the output from the auxiliary mixer stage 43 will be applied as before to the pulse oscillator of the transmitter 35 but is not applied to the first mixer stage 40 or to an earlier R. F. amplifying stage.

Figure F4 shows a further arrangement in which the pulse transmitter itself controls the phase of the local "reference" oscillation source. In this arrangement 50 denotes a pulse transmitter of suitable known type controlled by modulating circuit 51 and feeding an aerial 52. A receiving aerial 53 supplies an R. F. amplifier 54 which, in turn, feeds a mixer stage 55 which is also supplied with a local heterodyne oscillation by unit 56 to effect frequency conversion for further amplification by I. F. amplifier 58.

The transmitter 50 also supplies a portion of its R. F. output to a local oscillator 57 operating at the same fundamental transmission frequency so as to effect momentary phase-locking thereof during each outgoing pulse. This oscillator 57 in turn supplies its output for use as a "reference" oscillation to the mixer stage 55 or to an earlier R. F. amplifier stage whereby any "Doppler" frequency change in the received echo signals may be resolved as before and, after final demodulation in unit 59 and filtering in unit 60, used to provide either a visual or an audio indication.

In the above arrangement the mixing of the "reference" oscillation with the Doppler frequency-changed signal is effected at the fundamental frequency to transmission and reception. This is not essential however, and in some circumstances may not be desirable particularly when it is desired to effect some degree of limiting of strong signals, such as those received from large fixed objects before resolution of the Doppler-beat frequency. Figure D4 illustrates an alternative arrangement by which mixing is effected at the intermediate-frequency used. In this alternative arrangement the local "reference" oscillator 57 instead of supplying the mixer stage 55 feeds a further mixer stage 61 to which is also applied a part of the output from the local heterodyne oscillator 56. By this means a continuous oscillation at the same intermediate-frequency as that of a signal from a fixed object, i. e., one unaffected by Doppler effect, and having a locked phase-relationship to the outgoing pulses is available as a resultant output and is fed by way of buffer stage 62 to the second detector 59. At this second detector, mixing and demodulation of the two inputs is effected in the usual way and passed to indicating means as before.

Figure 5 shows yet a further embodiment in which the application of the pulse transmitter output to effect phase-locking is controlled by "gate-valve" means whereby any chosen part of the out-going exploring pulse oscillation may be used to effect locking. The local "reference" oscillation source also operates at a frequency different from that of transmission and reception. In this figure 61 denotes a normal pulse transmitter feeding an aerial 62 while 63 denotes the R. F. amplifier section of a pulse receiver coupled to receiving aerial 64. The R. F. amplifier section 63 feeds a mixer or frequency converter stage 65 which is supplied with the necessary local heterodyne oscillation from unit 66 and provides an output at intermediate-frequency to I. F. amplifier 67 which in turn feeds a demodulator unit 68. This unit 68 operates on the "Homodyne" principle and is accordingly supplied with a constant local oscillation at the fundamental I. F. frequency from source 69, the resultant demodulated output passing by way of lead 70 to the desired indicating means.

The local heterodyne oscillation source 66 also feeds a mixer unit 71 to which is applied a part of the output from the transmitter 61 under the control of a "gate" valve 72 which can be made conductive or non-conductive by application of a suitable control voltage through lead 73 to one of its electrodes, e. g. the suppressor grid in the case of a pentode. Such control voltage is timed to open and close the "gate" valve in synchronism with any desired instant between the start and finish of each modulation pulse supplied to the transmitter 61 whereby oscillations from the latter are fed momentarily to the mixer stage 71. In consequence, during such momentary feeding periods the mixer stage 71 will provide an output oscillation at I. F. frequency which is phase-locked to both transmitter 61 and local oscillator 66 and this output is fed through a buffer amplifier stage 74 to provide a phase-locking oscillation to the "homodyne" source 69. With this arrangement detection of Doppler-beat frequencies will take place in the final demodulator stage 68 in similar manner to that already described in connection with the modification of Figure 4. The above-mentioned "gating" control may be effected at points other than that described. It may be effected, for instance at the mixer stage 71, at the buffer stage 74 or between the local oscillator 66 and the mixer stage 71.

The various units referred to above with relation to Figures 2 to 5 can be of any suitable known form. The filter devices used for separating the Doppler-beat component subsequent to the second detector are conveniently of the low-pass type having a cut-off just below the pulse-recurrence frequency. This requirement may give rise to difficulty when high fundamental frequencies of transmission and reception are used due to extension of the likely Doppler-beat frequencies above those practicable as pulse-recurrence frequencies. In such cases an additional frequency changing stage may be provided, controllable in step by step manner by selection of a suitable local oscillator frequency, whereby different sections of a wide range of Doppler-beat frequencies may be placed within the range of the final low-pass filter.

Suitable "Homodyne" detection circuits for use in arrangements such as that of Figure 5, are shown in Figures 6a, 6b and 6c. In Figure 6a, the signal input is applied to a control grid of valve V1 and the homodyne "reference" oscillation to a control grid of valve V2 each having as a common anode load, the primary winding of a transformer T. The output from the secondary winding of this transformer is rectified by diode V3 and then passed through a low-pass filter F1 and the resultant output developed across the load resistance R1 used as already indicated.

Figure 6b shows a push-pull diode circuit in which the input signal and homodyne "reference" oscillations are applied respectively to the primary windings P1 and P2 of two transformers T1, T2 and the rectified outputs from diodes V4, V5 fed through filter circuits F2, F3 to the input circuits of valves V6, V7 arranged as a "long-tailed pair." This circuit allows D. C. connection to a video amplifier since the D. C. component in the output due to the "reference" oscillation is very small.

Figure 6c illustrates an arrangement using modulation of an electron stream. The input signal oscillation is applied to one controlling grid and the reference oscillation to another controlling grid of a heptode, hexode or pentode valve V8 and the resultant output derived from the anode circuit through a suitable filter F4. If necessary a triode-hexode or octode may be used and the oscillator portion thereof used as the "reference" oscillator valve.

By reference to diagram (d), (h) and (i) of Figure 1 it will be seen that the maximum output at the Doppler-beat frequency is obtained when the radial speed of the signal source is such that the pulse-recurrence period coincides with 180° phase change (or an odd multiple thereof) between the two beating frequencies. If, on the other hand, the radial speed is such that the pulse-recurrence period coincides with 360° phase change (or multiples thereof) between the two frequencies, the Doppler-beat output will be small. In order to avoid such difficulty, provision may be made for variation of the pulse-recurrence frequency. Doppler-beat frequency signals when detected by audio or tuned-reed devices will not provide information as to the range of the radially moving object while in some circumstances two or more radially moving objects may be detected simultaneously with confusing results. This may be obviated and knowledge of the range or ranges involved obtained by the provision of means known in the art as "strobing" whereby either the whole receiver or more preferably, the audio filter channel is held normally cut-off and is opened up momentarily at the end of a predetermined, and preferably adjustable, time interval after each transmitted exploring pulse. In this way the device is operative only at times corresponding to a certain chosen range and will only respond to objects at that range. By variation of the controlling means a series of ranges can be searched through an indication provided of the particular range at which a response is obtained.

We claim:

1. A radar system for the detection of moving objects employing a pulse modulated wave and utilizing the Doppler shift of frequency produced by such movement, comprising a transmitter arranged to generate exploring pulses under the control of a radio frequency oscillation derived from an oscillation source, a superheterodyne receiver to which received echo signals are adapted to be applied, a mixer stage adapted to mix signals from the receiver local oscillator with signals from said oscillation source and to give an output reference oscillation at the intermediate frequency of said receiver, and means for injecting said reference oscillation into said receiver to mix with echo signals at the intermediate frequency.

2. A radar system as claimed in claim 1 and including a filter connected to said receiver at a stage after that at which said reference oscillation is injected to filter out the Doppler beat frequency.

3. A radar system for the detection of moving objects employing a pulse modulated wave and utilizing the Doppler shift of frequency produced by such movement, comprising a superheterodyne receiver to which received echo signals are adapted to be applied, an oscillator giving an output oscillation at the intermediate frequency of said receiver, a mixer stage adapted to mix signals from the local oscillator of said receiver with said oscillation at the intermediate frequency and to give an output oscillation at the radio frequency of transmission, means for pulse modulating this radio frequency oscillation, means for transmitting the resultant pulses of radio frequency energy, means for injecting one of said oscillations into said receiver to mix with received echo signals, and a filter connected to said receiver at a stage after that at which said oscillation is injected to filter out the Doppler beat frequency.

4. A radar system for the detection of moving objects employing a pulse modulated wave and utilizing the Doppler shift of frequency produced by such movement, comprising a superheterodyne receiver to which received echo signals are adapted to be applied, an oscillator oscillating at the intermediate frequency of said receiver, a mixer stage adapted to mix signals from the local oscillator of said receiver with signals from said intermediate frequency oscillator and to give an output radio frequency oscillation, a transmitter arranged to generate exploring pulses under the control of said radio frequency oscillation, and means for injecting the output of said intermediate frequency oscillator into said receiver to mix with echo signals at the intermediate frequency.

5. A radar system for the detection of moving objects employing a pulse modulated wave and utilizing the Doppler shift of frequency produced by such movement, having a radar transmitter adapted to transmit pulses of radio frequency energy, and having a receiver comprising an oscillator oscillating at the radio frequency of said pulses, means for injecting said pulses into said oscillator to effect phase-locking thereof, means for deriving a reference oscillation from said oscillator, means for injecting said reference oscillation into said receiver, and a filter connected to said receiver at a stage after that at which said reference oscillation is injected to filter out the Doppler beat frequency.

6. A radar system for the detection of moving objects and employing a pulse modulated wave and utilizing the Doppler shift of frequency produced by such movement having a radar transmitter comprising a source of radio frequency pulses, a source of continuous oscillations at said radio frequency and means for transmitting said pulses, and a superheterodyne radar receiver adapted to receive echo signals received in response to the transmitted pulses and comprising a source of oscillations at the intermediate frequency, a mixer stage fed with oscillations from the local oscillator of said superheterodyne receiver and with one of said other oscillations and giving an output reference oscillation, means for injecting said reference oscillation into said receiver to mix with received echo signals, and a filter connected to said receiver at a stage after that at which said reference oscillations are injected to filter out the Doppler beat frequency.

7. A radar system for the detection of moving objects employing a pulse modulated wave and utilizing the Doppler shift of frequency produced by such movement; having a radar transmitter comprising a radio frequency oscillator giving output oscillations at the radio frequency of transmission, means for pulse modulating said radio frequency oscillations, and means for transmitting the resultant pulses of radio frequency energy; and having a superheterodyne radar receiver adapted to receive echo signals received in response to the transmitted pulses comprising a mixer stage, said receiver including a local oscillator and also an intermediate frequency amplifier, means for injecting oscillations from said local oscillator and from said radio frequency oscillator into said mixer stage whereby to obtain a reference oscillation at the intermediate frequency of said receiver, means for injecting said reference oscillation into said receiver to mix with echo signals at the intermediate frequency and a filter connected to a stage of said receiver after that at which said reference oscillation is injected to filter out the Doppler beat frequency.

HARRY GRAYSON.
DENIS EDWIN BROWN.

REFERENCES CITED

The following references are of record in the file of this patent:

UNITED STATES PATENTS

| Number | Name | Date |
| --- | --- | --- |
| 2,406,316 | Blumlein et al. | Aug. 27, 1946 |
| 2,407,198 | Wolff | Sept. 3, 1946 |
| 2,415,095 | Varian | Feb. 4, 1947 |
| 2,421,020 | Earp | May 27, 1947 |

FOREIGN PATENTS

| Number | Country | Date |
| --- | --- | --- |
| 111,594 | Australia | Oct. 3, 1940 |